(12) United States Patent
Tracy

(10) Patent No.: US 8,171,783 B2
(45) Date of Patent: May 8, 2012

(54) TIRE TREAD SCANNER DRIVE-OVER UNIT

(75) Inventor: Roger H. Tracy, Chicago, IL (US)

(73) Assignee: Tire Measurements, Inc., Chicago, IL (US)

( * ) Notice: Subject to any disclaimer, the term of this patent is extended or adjusted under 35 U.S.C. 154(b) by 8 days.

(21) Appl. No.: 12/938,143

(22) Filed: Nov. 2, 2010

(65) Prior Publication Data

US 2011/0100108 A1 May 5, 2011

Related U.S. Application Data

(60) Provisional application No. 61/257,210, filed on Nov. 2, 2009.

(51) Int. Cl.
*G01M 17/02* (2006.01)

(52) U.S. Cl. ........................................................ 73/146

(58) Field of Classification Search ......................... None
See application file for complete search history.

(56) References Cited

U.S. PATENT DOCUMENTS

| | | | | |
|---|---|---|---|---|
| 5,789,668 A * | 8/1998 | Coe et al. | ............ | 73/146 |
| 5,987,978 A * | 11/1999 | Whitehead | ............ | 73/146 |
| 6,069,966 A * | 5/2000 | Jones et al. | ............ | 382/100 |
| 6,386,025 B2 * | 5/2002 | Alexander | ............ | 73/146 |
| 7,738,120 B2 * | 6/2010 | Braghiroli | ............ | 356/635 |
| 7,975,540 B2 * | 7/2011 | Angell et al. | ............ | 73/146 |
| 2001/0045125 A1 * | 11/2001 | Alexander | ............ | 73/146 |
| 2007/0295071 A1 * | 12/2007 | Iwase et al. | ............ | 73/146 |
| 2010/0000310 A1 * | 1/2010 | Braghiroli | ............ | 73/146 |
| 2010/0180676 A1 * | 7/2010 | Braghiroli et al. | ............ | 73/146 |
| 2011/0100108 A1 * | 5/2011 | Tracy | ............ | 73/146 |

* cited by examiner

*Primary Examiner* — Andre Allen

(74) *Attorney, Agent, or Firm* — Michael A. Mann; Nexsen Pruet, LLC

(57) ABSTRACT

A tire tread scanner drive-over unit is used to measure the tread depth and tire wear condition of a vehicle with two or four wheels on the axle. The unit includes a surface with two tire position area areas, each between an elevated rearward area and an elevated forward area to define a trough therebetween. Scanners are located behind scanner windows in the rearward area under scanner covers. When a vehicle is driven onto the surface so that the tires of one of its axels are on the tire position areas between the rearward and forward areas, the tires self-center against the scanner windows so that the tire profile may be measured to determine wear and wear characteristics.

10 Claims, 3 Drawing Sheets

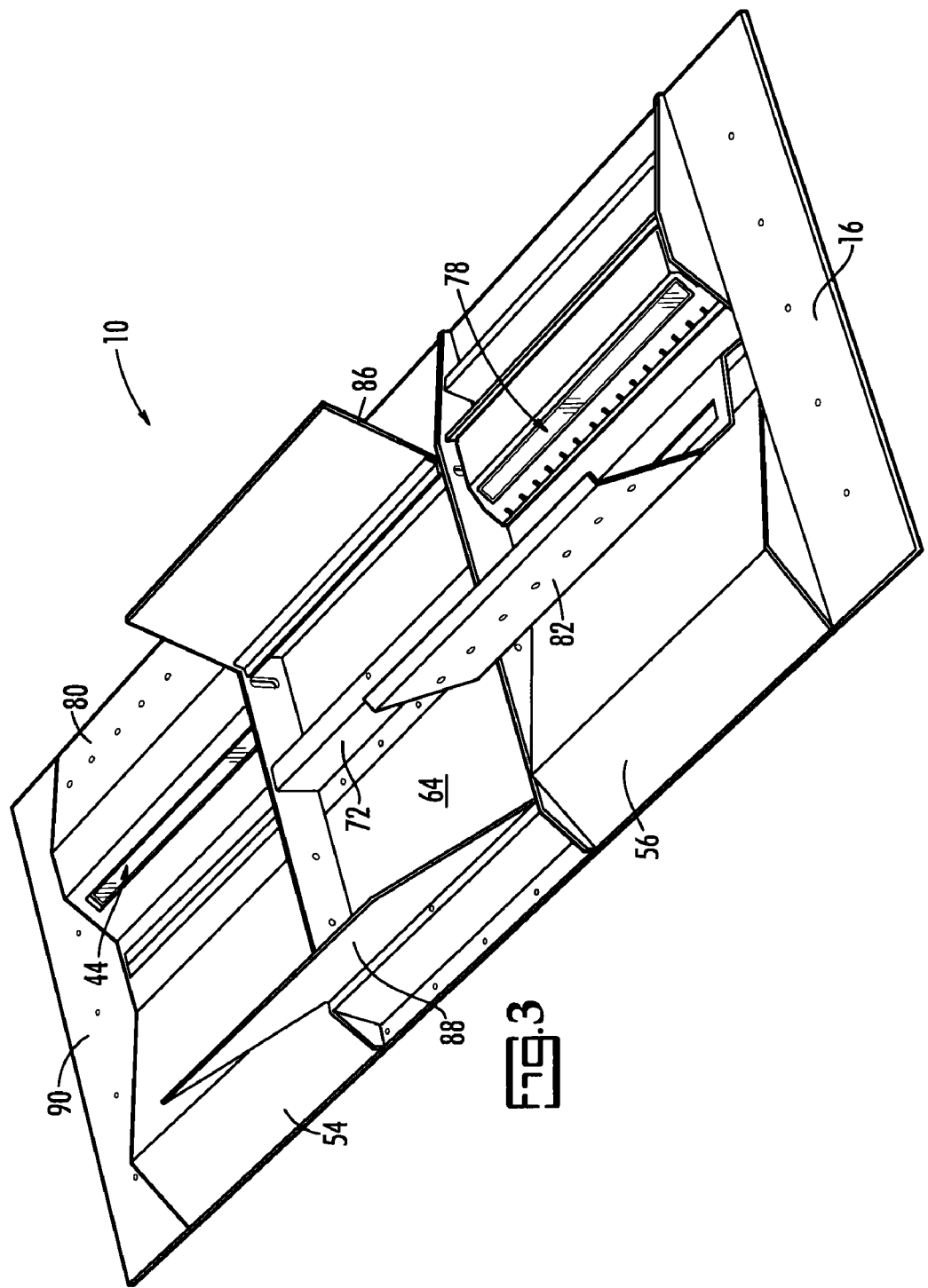

TIRE TREAD SCANNER DRIVE-OVER UNIT

PRIORITY CLAIM

Priority is claimed to U.S. provisional patent application Ser. No. 61/257,210, filed 2 Nov. 2009, which is herein after incorporated in its entirety by reference.

BRIEF DESCRIPTION OF THE DRAWINGS

In the figures,

FIG. 3 is an assembled perspective view of a drive-over tread scanner unit, with hinged covers and rearward scanner cover opened, according to an embodiment of the present invention.

DETAILED DESCRIPTION OF PREFERRED EMBODIMENTS

Figure 1:
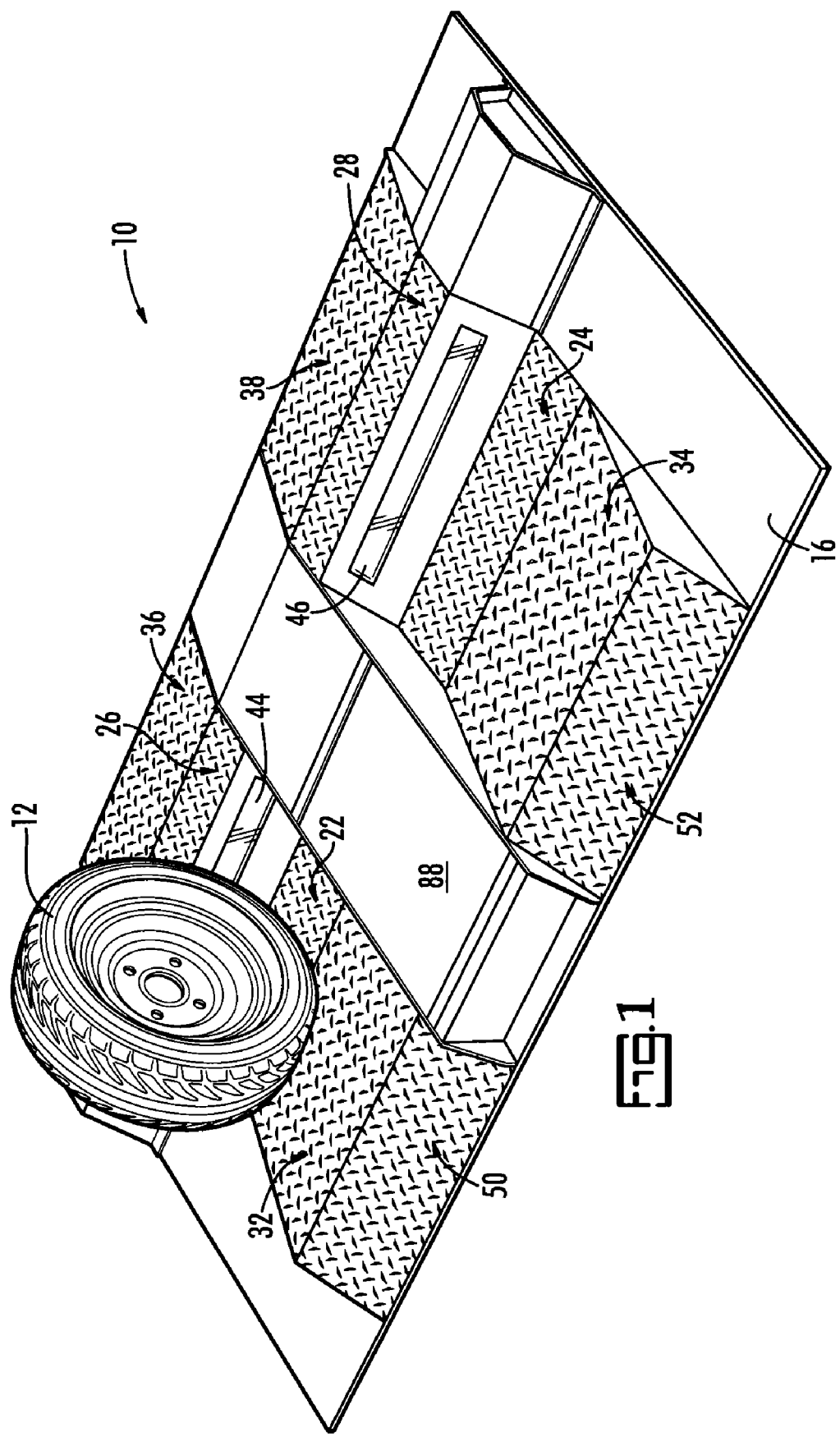
FIG. 1 is a perspective view of a drive-over tread scanner unit with a tire thereon, according to an embodiment of the present invention.

The present tire tread scanner measures the tread depth and tire wear condition of a vehicle with two or four wheels on each axle.

Referring now to the figures, there is shown a tire tread scanner drive-over unit, generally designated by reference number 10. A single tire 12 is shown positioned on one side of drive-over unit 10. In actual use, a vehicle with two tires 12 or four tires 12 on each axel would be driven over drive-over unit 10, stopped when all the tires 12 of one axel are in the position of tire 12 shown in FIG. 1 with respect to drive-over unit 10 so that the tire tread profiles of all tires on that axel can be measured.

A device for scanning the tire profile based on the scanner and related software as described in U.S. Pat. No. 6,789,416, which is herein incorporated in its entirety by reference, is used in the present device to determine that profile and whether there is sufficient tread depth for the safe operation of the vehicle and the character of the tread wear.

Driver-over unit 10 includes a surface 16, a central, hinged access panel 88 and symmetric tire position areas 22, 24, that assist the driver of the vehicle in properly positioning and centering the vehicle's tires so that both tires on the same axel, front axel or rear axel, can be scanned at the same time. Tire position areas 22, 24, are characterized by being areas lower than and between adjacent, rearward areas 26, 28, and adjacent forward areas 32, 34, so that gravity tends to position tires 12 between the rearward areas 26, 28, and forward areas 32, 34. In the present specification, rearward corresponds to the first portion of surface 16 encountered by the vehicle and forward to the next portion of surface 16 encountered by the vehicle.

To elevate rearward areas 26, 28 with respect to tire position areas 22, 24, respectively, ramps 36, 38, respectively, are formed on surface 16. Ramps 36, 38 require the driver of the vehicle to drive up, thereby implicitly signaling by vertical motion that the vehicle's tires have moved onto surface 16. As the driver continues to drive slowly forward, the vehicle crosses over scanning windows 44, 46, in descending to tire position areas 22, 24, and the forward portion of its tires come to meet forward areas 32, 34. The vehicle then stops and is placed in neutral gear, whereupon it will rock slightly rearward, urged by forward areas 32, 34, which hold tires against scanning windows 44, 46, until the driver drives forward over forward areas 32, 34 and down exit ramps 50, 52.

It will be clear that as long as tire position areas 22, 24 are lower than rearward areas 26, 28 and forward areas 32, 34, and tire position areas 22, 24, are sufficiently narrow so that forward areas 32, 34, urge tires against rearward areas 32, 34 where the treads of tires are against glass-covered scanning windows 44, 46, that the tires of the vehicle will be positioned properly for measuring tread depth. The specific amounts of elevation of rearward areas 22, 24 with respect to forward areas, 32, 34 is not critical nor is the specific elevation of these areas with respect to the surroundings or surface 16 so long as a trough is formed between them for tire position areas 22, 24. The shape of drive-over unit 10, where tire 12 is positioned during the scanning process, is designed so that tire 10 can roll to a stationary position with surface of tire 12 against the scanning windows 44, 46 where it is in the optimum position for scanning.

The surface of tire 12, that is, the peripheral surface which engages the road and is grooved, is scanned using a laser triangulation sensor which repeatedly measures the distance to both the surface of the tire and to the bottom of the grooves formed in that surface. The series of distance measurement across the surface of the tire are more useful if close together, preferably much closer than the width of the grooves, such as a distance measurement every 0.5 mm across the surface of the tire. The resulting stream of data may be transferred to a computer by means of an Ethernet cable where software, installed on that computer, calculates the tread depth for five zones across the surface of the tire. The two outermost zones show the calculated tread depth for the tire shoulders. The remaining three zones are interior to these two shoulder zones. Five tread depths, one for each zone, are reported for each tire.

Tire wear may be analyzed by the resident software to determine the likely cause of the wear and to provide recommendations for either replacing the tire or taking remedial action such as tire rotation or suspension alignment in order to gain the most additional life from the existing tires.

Drive-over unit 10 is designed to be modular in construction and capable of being assembled on site on any hard surface, such as concrete, without any civil engineering work to prepare the surface. Drive-over unit 10 is bolted together from simple sheet metal parts manufactured on a press brake without stamping tooling. Its component parts may be powder-coated to resist corrosion. The component parts may also be color-coded so that the driving area intended for the tires 10 is readily evident to the vehicle driver from the vertical motion of the car. Drive-over unit 10 may capable of taking up to a 12 ton axle load.

Figure 2:
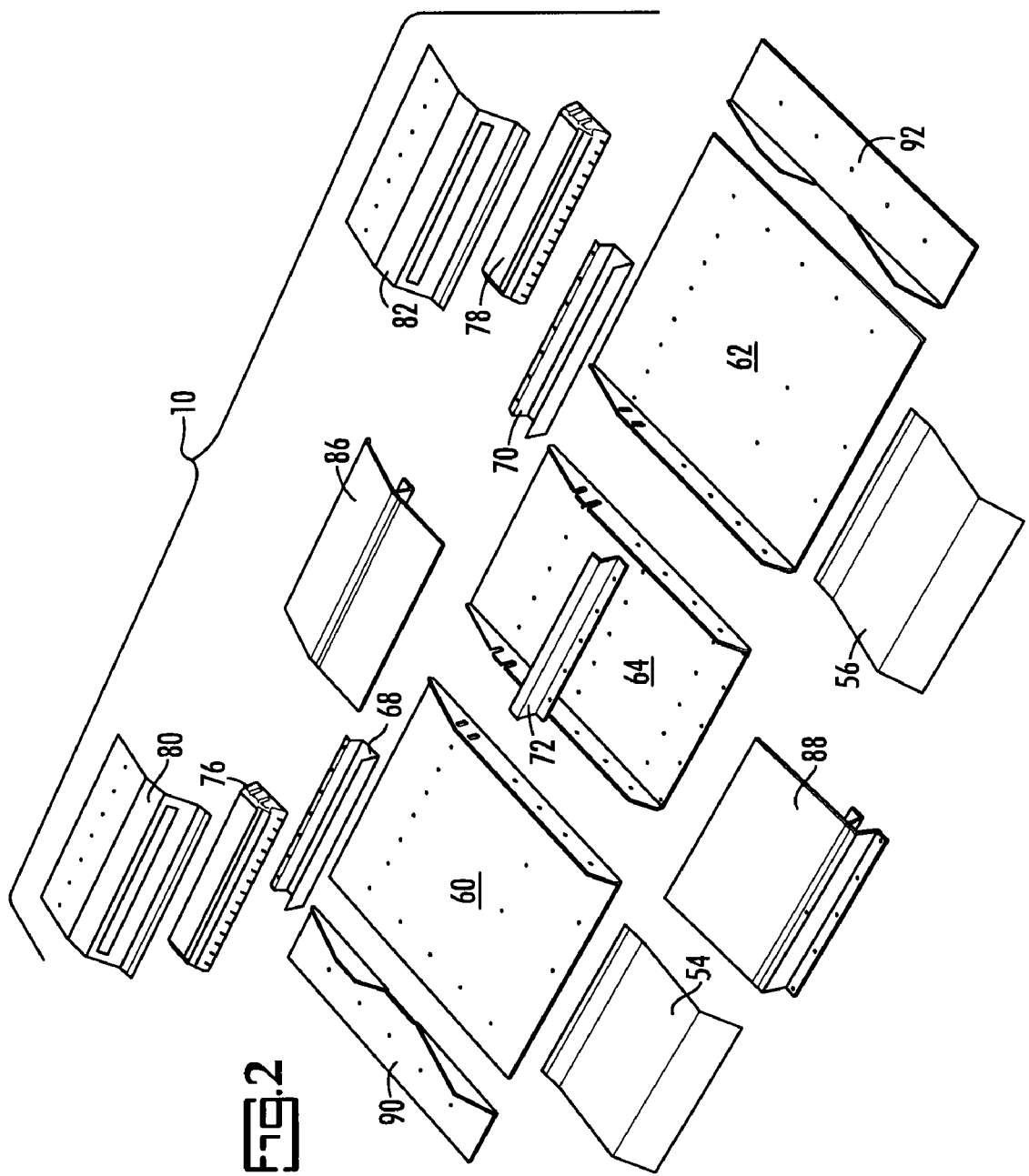
FIG. 2 is an exploded perspective view of a drive-over tread scanner unit, according to an embodiment of the present invention.

FIG. 1 shows the assembled drive-over unit 10; FIG. 2 shows an exploded perspective view of unit 10; FIG. 3 shows the assembled driver-over unit with some of the hinged covers opened.

Referring now to FIGS. 2 and 3, surface 16 may include a left portion 60, a right portion 62 and a central portion 64. Lid support panels 68, 70, 72, are attached to left portion 60, right portion 62 and central portion 64, respectively. Lid support panels 68, 70, 72, are structural in nature; that is, they are strong enough to provide support for the components that will be laid above them when those components are bearing the weight of a vehicle. Scanners 76, 78 are positioned rearward of lid support panels 68, 70, and then covered with scanner covers 80, 82, which are also structural to support the weight of vehicles and protect scanners 76, 78.

Forward ramp covers 54, 56, are hingedly attached to left portion 60 and right portion 62, respectively, and a rear and a forward hinged access lid 86, 88, are hingedly attached to central portion 64 at its rearward and forward edges, respectively. The edges of rear and forward hinged access lids 86, 88, rest on lid support panel 72. Lateral panels 90, 92, may be added to complete surface 16.

The present drive-over unit 10 is self-contained, requiring only a power line and an Ethernet connection. Ethernet connectors are located on both the left and right ends of scanners 76, 78, respectively, for installation.

Two laser scanners 76, 78 are located behind scan windows 44, 46 and operate on the same principle as U.S. Pat. No. 6,789,416. A laser sensor (not shown) travels along a rod (not shown) behind scanner window 44, 46, for a distance of about 850 mm. The laser is driven by a stepper motor (not shown) and takes a new distance measurement to the surface of tire 12 every 0.5 mm across the surface of the tire 12. The stepper motor determines the precise "x-axis" position of each scan across the surface of the tire 12. When a groove in encountered, the laser takes a distance measurement to the bottom of the groove. The software is designed to automatically identify and exclude the space between dual wheels on a single axle and to report tread depths only for the four tires on a dual wheel axle.

In use, a vehicle approaches drive over unit 10 from entrance ramps 36, 38. This enables the structure of drive-unit 10 to take the force of the vehicle load on entrance ramps 36, 38, respectively, of scanner covers 80, 82, opposite that of scanning windows 44, 46, so that tires 12 do not bear on glass of scanning windows 44, 46. When the axle of the vehicle has moved onto tire position area 22, 24, and the vehicle transmission has been placed in neutral, the vehicle will roll back slightly against scanning windows 44, 46, in the optimum position for scanning.

A computer work station may be located close to drive-over unit 10 to enable convenient operation of the drive-over unit 10, analysis of the data from scanners 76, 78, and printing of reports.

Those familiar with tire tread depth measuring will see from the foregoing preferred embodiments many changes and substitutions may be made to the preferred embodiments without departing from the spirit and scope of the present invention, which is defined by the appended claims.

What is claimed is:

1. A tire tread scanner, comprising:
   (a) a tread depth scanner adapted to produce a profile of a tire tread; and
   (b) a surface carrying a tire position area between a rearward area and a forward area, said forward area and rearward area being higher in elevation than said tire position area, said rearward area having a scanner window formed therein, said scanner carried behind said window so that, when a tire is on said tire position area between said rearward area and said forward area, said scanner is positioned to scan said tire surface through said scanner window to obtain a profile of said tire tread.

2. The tire tread scanner of claim 1, further comprising an entrance ramp to said rearward area and an exit ramp from said forward area.

3. The tire tread scanner of claim 1, wherein said tire position area is narrow enough so that, when said tire in on said tire position area, said forward area urges said tire against said scanner window of said rearward area.

4. The tire tread scanner of claim 1, wherein said scanner further comprises an Ethernet port to facilitate export of data from said scanner.

5. A tire tread scanner, comprising:
   (a) two spaced apart tread depth scanners adapted to produce profiles of treads of tires; and
   (b) a surface carrying two tire position areas, each tire position area being between a rearward area and a forward area, said forward area and rearward area being higher in elevation than said tire position area, said rearward area having a scanner window formed therein, said scanner carried behind said window so that, when a tire is on said tire position area between said rearward area and said forward area, each scanner of said two scanners is positioned to scan said tire surface through said scanner window to obtain a profile of said tire tread.

6. The tire tread scanner of claim 5, further comprising an access panel between said two scanners.

7. The tire tread scanner of claim 5, further comprising an entrance ramp from said surface to said rearward area and an exit ramp from said forward area.

8. The tire tread scanner of claim 5, wherein said each tire position area area is narrow enough so that, when said tire in on said tire position area area, said forward area urges said tire against said scanner window of said rearward area.

9. The tire tread scanner of claim 5, wherein said scanner further comprises an Ethernet port to facilitate export of data from said scanner.

10. A tire tread scanner, comprising:
   (a) a surface having a left portion, a right portion and a central portion;
   (b) a first lid support panel attachable to said left portion;
   (c) a second lid support panel attachable to said right portion;
   (d) a third lid support panel attachable to said central portion;
   (e) a forward ramp cover hingedly attachable to said left portion;
   (f) a forward ramp cover hingedly attachable to said right portion;
   (g) a forward hinge access cover hingedly attached to said central portion;
   (h) a rearward hinge access cover hingedly attached to said central portion so that both said forward hinge access cover and said rearward hinge access cover rest on said third lid support panel when said third lid support panel is attached to said said central portion;
   (i) a first scanner cover hingedly attachable to said left portion, said first scanner cover having a scanner window formed therein;
   (j) a second scanner cover hingedly attachable to said right portion, said second scanner cover having a scanner window formed therein;
   (k) a first scanner positionable on said left portion below said first scanner cover and behind said first lid support panel; and
   (l) a second scanner positionable on said right portion below said first scanner cover and behind said first lid support panel.

\* \* \* \* \*